United States Patent [19]
Olmr

[11] Patent Number: 5,893,443
[45] Date of Patent: Apr. 13, 1999

[54] DRIVE TRAIN OF A PULLEY-DRIVEN GEARBOX AND CLUTCH DEVICE THEREFOR

[76] Inventor: Jaroslav J. Olmr, 2919 N. 8th St., Sheboygan, Wis. 53083

[21] Appl. No.: 08/772,485

[22] Filed: Dec. 23, 1996

[51] Int. Cl.⁶ .................. F16D 13/44; F16H 7/02
[52] U.S. Cl. .................. 192/66.31; 192/89.27; 192/96; 474/171
[58] Field of Search .................. 192/3.51, 3.54, 192/66.31, 89.21, 89.27, 96, 101; 474/171

[56] References Cited

U.S. PATENT DOCUMENTS

| | | | |
|---|---|---|---|
| 641,046 | 1/1900 | Sharp | 474/171 X |
| 716,754 | 12/1902 | Pivert | 192/89.21 |
| 1,288,693 | 12/1918 | Schaum | 192/96 X |
| 2,398,716 | 4/1946 | Ojutkangas | 192/96 |

*Primary Examiner*—Richard M. Lorence
*Attorney, Agent, or Firm*—Burns, Doane, Swecker & Mathis, L.L.P.

[57] ABSTRACT

A drive train includes a gearbox having an input shaft, and a belt-driven pulley for transmitting rotation to the input shaft. The drive pulley is mounted to the main shaft by a bearing so as to be rotatable relative thereto. A clutch disk is mounted for rotation with the input shaft and is slidable relative to the input shaft so as to be movable into and out of contact with the drive pulley. When the clutch disk is in contact with the drive pulley, the input shaft is rotated. An actuator enables an operator to disengage the clutch disk from the drive pulley.

8 Claims, 2 Drawing Sheets

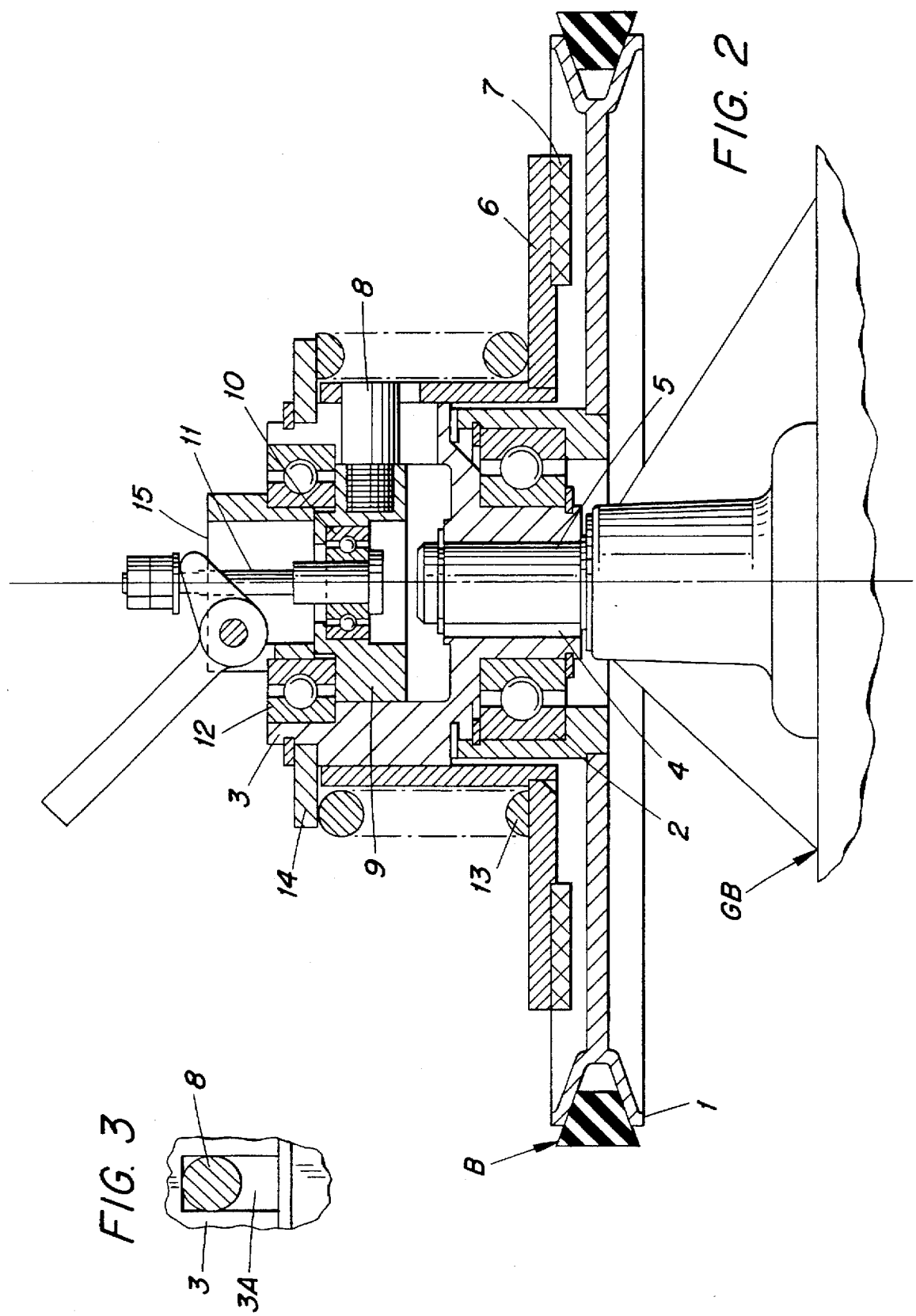

DRIVE TRAIN OF A PULLEY-DRIVEN GEARBOX AND CLUTCH DEVICE THEREFOR

BACKGROUND OF THE INVENTION

The invention relates to a de-clutching mechanism for belt-driven transmissions, such as are used in small tractors like self-propelled lawnmowers.

Small tractors, like self-propelled lawnmowers, include a gearbox which carries a gear shift mechanism. The gears are driven by an input shaft which is fixedly connected to a drive pulley, the pulley being driven by a belt that is rotated by a motor.

In order to shift gears, it is necessary to declutch in order to interrupt the power being transmitted to the input shaft. That has traditionally been performed by loosening the belt tension to permit the belt to slip relative to the drive pulley.

Such an arrangement involves a number of shortcomings. The loosening of the belt gives rise to a risk that the belt can become dislodged from the drive pulley. Also, the slippage of the belt relative to the drive pulley produces appreciable wearing of the belt, thereby shortening the belt life. Special belt design techniques have been implemented to reduce the loss of belt life but the result is relatively expensive belts. Also, the mechanisms for loosening/tightening the belt can be relatively complicated and expensive.

In addition, when it is desired to change gears as the tractor is moving downhill, the large gear ratio typical of such gearboxes means that even the slightest force applied to the pulley by the belt will make it difficult to effect a smooth gear shift. Therefore, it would be desirable to ensure that smooth gear shifting can be effected at all times, as well as to increase belt life, reduce belt cost, and minimize the risk of the belt becoming dislodged from the pulley.

SUMMARY OF THE INVENTION

These and other objects are achieved by the present invention which relates to a drive train comprising a gearbox having an input shaft which is rotatable about an axis. A drive pulley is mounted coaxially rotation of relative to the input shaft by a bearing, for permitting the drive pulley relative to the input shaft. A motor-driven belt is wrapped around the drive pulley for rotating the drive pulley. A clutch disk is movable along the axis into and out of engagement with the drive pulley. The clutch disk is rotated by the drive pulley when in engagement therewith. A rotation transmitting mechanism is provided for transmitting rotation of the clutch disk to the input shaft when the clutch disk is in engagement with the drive pulley. An actuating mechanism is provided which is operably connected to the clutch disk for selectively moving the clutch disk into and out of engagement with the drive pulley.

BRIEF DESCRIPTION OF THE DRAWING

The objects and advantages of the invention will become apparent from the following detailed description of a preferred embodiment thereof in connection with the accompanying drawing in which like numerals designate like elements and in which:

FIG. 2 is a view similar to FIG. 1 with the clutch disk disengaged from the drive pulley; and FIG. 3 is a fragmentary view depicting a pin slidable in a slot of a main hub according to the present invention.

DETAILED DESCRIPTION OF A PREFERRED EMBODIMENT OF THE INVENTION

Figure 1:
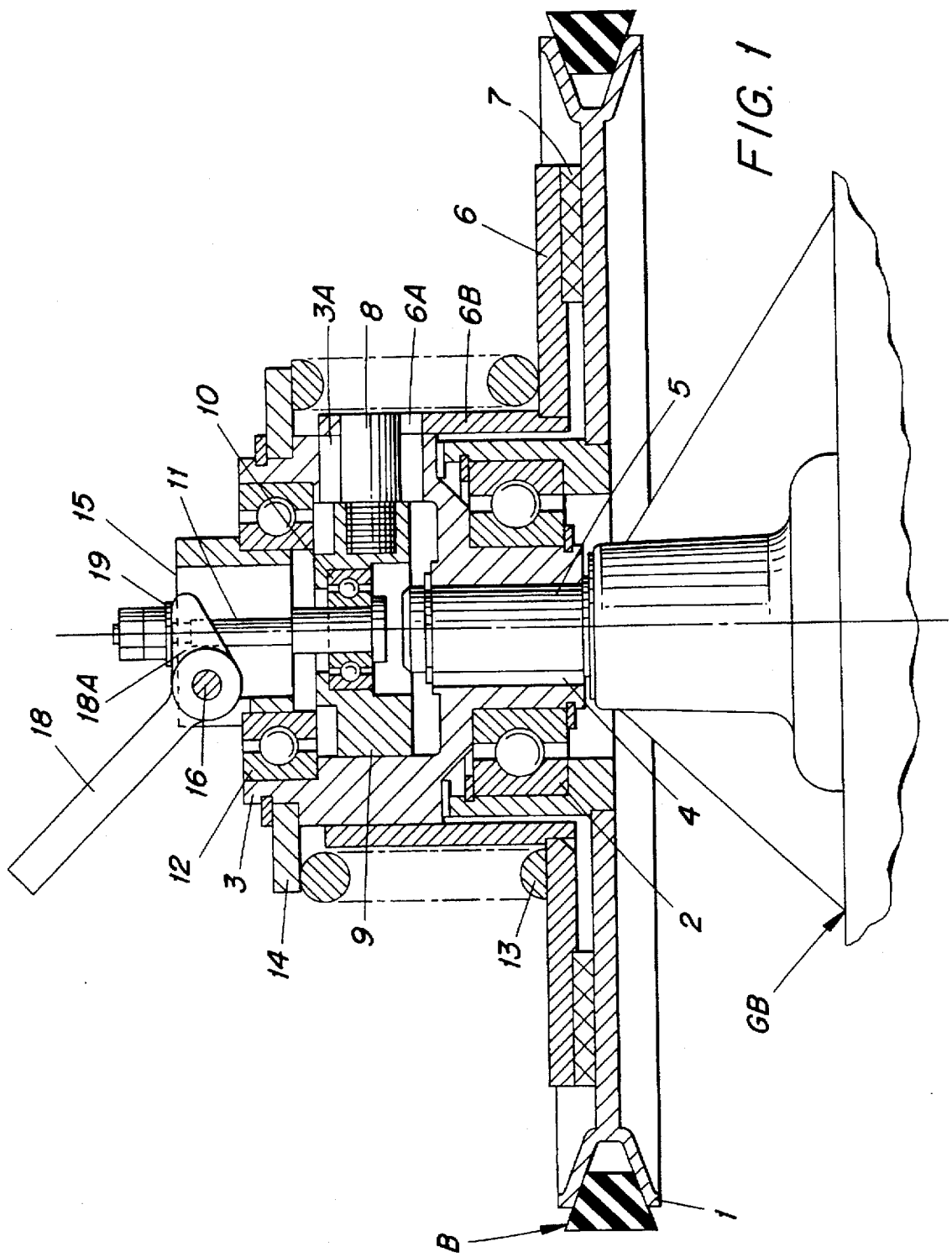
FIG. 1 is a longitudinal sectional view taken through a drive train according to the present invention, with a clutch disk thereof being in engagement with a drive pulley.

A gear train includes an input shaft 5 which is to be selectively driven by a drive pulley 1. The pulley 1 is driven by a belt B which is, in turn, driven by a motor (not shown). This apparatus could be mounted on a small tractor or the like for transmitting power to the drive wheels.

In accordance with the present invention, power to the input shaft 5 can be completely interrupted without loosening the belt B, i.e., while maintaining full belt tension against the pulley.

A preferred clutching mechanism for achieving that result will now be described. The clutch mechanism includes a main hub which is keyed by a key 4 to the shaft 5 for rotation therewith. The pulley 1 is rotatably mounted on the main hub 3 by a main bearing 2.

The main hub 3 forms a recess in which is disposed an auxiliary hub 9. Three pins 8 are threadedly attached within the auxiliary hub 9 and project therefrom in a direction which is radial with respect to the axis A of the shaft 5. Each pin 8 passes through a respective slot 3A formed in the main hub 3, the slot being elongated in a direction parallel to the axis A. Each pin 8 also extends through a respective slot 6A formed in a sleeve 6B which is affixed to a clutch disk 6. The pins 8 and main hub 3 are thus rotatable together. The clutch disk 6 carries a friction lining 7 on a side thereof facing the pulley 1.

From the foregoing, it will be appreciated that the pins 8 are rotatable with the main and auxiliary hubs 3, 9 and are slidable relative to the main hub 3 in the axial direction.

The auxiliary hub 9 is rotatably mounted by a first auxiliary bearing 10 on an auxiliary shaft 11, which auxiliary shaft 11 is arranged coaxially relative to the main shaft 5 and is slidable axially relative to the main shaft. The auxiliary hub 9, the first auxiliary bearing 10, the auxiliary shaft 11, the pins 8, the sleeve 6B and the clutch disk 6 form an auxiliary unit which is movable in the axial direction. That unit is biased axially toward the pulley 1, i.e., in a clutch-engaging direction, by a coil compression spring 13 which bears against the clutch disk 6 and a flange 14 which is mounted on the main hub 3.

Mounted at an end of the main hub 3 is a ring 15 which is press fit into an inner race of a second auxiliary bearing 12. The outer race of that bearing is press fit into the main hub 3, so the main hub 3 is rotatable relative to the ring 5. Mounted to the ring 15 by a pivot pin 16 is a link 18 which is operably connected to a clutch actuator, such as a clutch pedal (not shown). The link 18 includes an ear 18A which is engageable with a washer 19 that is affixed to an end of the auxiliary shaft 11.

In operation, the clutch disk 6 is biased into engagement with the pulley 1, whereby rotation of the belt-driven pulley 1 is transmitted to the main shaft 5 of the gearbox GB through the sleeve 6B, pins 8, and main hub 3. In order to disengage that drive transmission, the clutch pedal (not shown) is depressed, causing the link 18 to pivot about the pivot pin 16, thereby displacing axially the unit comprised of the auxiliary shaft 11, first auxiliary bearing 10, auxiliary hub 9, pins 8, sleeve 6B, and clutch disk 6. Such axial displacement breaks the power-transmitting connection between the friction lining 7 and the pulley 1, and also produces a compression of the spring 13, so that upon a subsequent release of the clutch pedal, the unit is restored to its power-transmitting (clutch-engaged) state.

It will thus be appreciated that a de-clutching operation can be performed without loosening the drive belt B. Hence, the risk of the belt becoming dislodged from the pulley 1 is minimized, and no accelerated belt wear is produced. Additionally, there is no need to provide a relatively expensive mechanism for loosening/tightening the belt.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed:

1. A drive train, comprising:

a gearbox having an input shaft rotatable about an axis;

a drive pulley mounted coaxially relative to the input shaft by a bearing, for permitting the drive pulley to rotate relative to the input shaft;

a motor-driven belt wrapped around the drive pulley for rotating the drive pulley;

a clutch disk movable along the axis into and out of engagement with the drive pulley, the clutch disk being rotated by the drive pulley when in engagement therewith;

a rotation transmitting mechanism for transmitting rotation of the clutch disk to the input shaft when the clutch disk is in engagement with the drive pulley; and an actuating mechanism operably connected to the clutch disk for selectively moving the clutch disk into and out of engagement with the drive pulley;

wherein the rotation transmitting mechanism comprises a main hub mounted to the input shaft for rotation therewith about the axis; an auxiliary shaft coaxial with the axis; an auxiliary hub mounted on the auxiliary shaft for rotation relative thereto about the axis and for axial sliding movement relative to the main hub; the clutch disk being connected to the main and auxiliary hubs for rotation therewith, and mounted for axial sliding movement relative to the main hub along with the auxiliary hub.

2. The drive train according to claim 1 wherein the actuating mechanism comprises a spring biasing the clutch disk toward the drive pulley, and an actuator element for axially displacing a unit comprised of the auxiliary shaft, auxiliary hub, and clutch disk, relative to the main hub and against the bias of the spring for disengaging the drive transmission between the drive pulley and input shaft.

3. The power transmitting mechanism according to claim 2, further including a sleeve affixed to the clutch disk and arranged coaxially with the axis, the sleeve connected to the auxiliary hub by at least three pins extending through respective slots formed in the main hub, the slots being elongated in a direction parallel to the axis.

4. The power transmitting mechanism according to claim 3 wherein the pins are threadedly mounted to the auxiliary hub and project radially with respect to the axis.

5. The power transmitting mechanism according to claim 2 wherein the actuator element includes a ring mounted to the main hub so that the main hub is rotatable relative thereto about the axis, and a link pivotably mounted on the ring, the link being engageable with the unit for applying an axial force thereto.

6. The power transmitting mechanism according to claim 1 wherein the auxiliary hub is mounted in a recess of the main hub for axial sliding movement relative thereto.

7. A drive train comprising:

a gearbox including a main shaft rotatable about an axis;

a drive pulley rotatable about the axis;

a belt wrapped around the drive pulley for rotating the drive pulley;

a main hub mounted to the main shaft for rotation therewith, the main hub including a recess, and a plurality of slots elongated in directions parallel to the axis and communicating with the recess;

an auxiliary hub mounted in the recess for axial sliding movement relative to the main hub;

an auxiliary shaft extending into the recess along the axis, and carrying the auxiliary hub so that the auxiliary hub rotates relative to the auxiliary shaft about the axis and is axially movable with the auxiliary shaft;

a sleeve arranged coaxially around the main hub;

a clutch disc attached to an end of the sleeve and being frictionally engageable with the pulley;

a plurality of pins extending through respective ones of the slots for fixing the sleeve to the auxiliary hub, whereby the auxiliary shaft, auxiliary hub, pins, sleeve, and clutch disk form a unit that is axially movable relative to the main hub;

a spring extending between the main hub and unit for biasing the unit axially in a direction causing the clutch disk to bear against the pulley;

a ring mounted in the recess so that the main hub is rotatable relative to the ring; and an actuator link pivotably mounted to the ring and being engageable with the auxiliary shaft for axially displacing the unit against the spring bias for disengaging the clutch disk from the pulley.

8. The power transmitting mechanism according to claim wherein the pins are threadedly connected to the auxiliary hub.

* * * * *